United States Patent [19]
Hegel

[11] 3,857,307
[45] Dec. 31, 1974

[54] SHOCK ABSORBER ASSEMBLY TOOL
[75] Inventor: Robert W. Hegel, Monroe, Mich.
[73] Assignee: Monroe Auto Equipment Company, Monroe, Mich.
[22] Filed: July 11, 1973
[21] Appl. No.: 378,380

[52] U.S. Cl. ............................................. 81/90 C
[51] Int. Cl. .................................... B25b 13/48
[58] Field of Search ........ 81/71, 90 R, 90 C; 29/240

[56] References Cited
UNITED STATES PATENTS
1,579,992  4/1926  Altman .............................. 81/90 C
FOREIGN PATENTS OR APPLICATIONS
476,162  11/1952  Italy .................................. 81/90 C
721,295  6/1942  Germany ........................... 81/90 C Primary Examiner—Al Lawrence Smith
Assistant Examiner—James G. Smith
Attorney, Agent, or Firm—Harness, Dickey & Pierce

[57] ABSTRACT

A shock absorber assembly tool for use with cartridge-type shock absorbers which are removably mounted within a cylindrical housing having a threaded retaining ring or the like mounted at one end thereof, the tool including a pair of longitudinally aligned spaced apart manually engageable handle sections, an intermediate section disposed between and connecting the handle sections, an adjustment member longitudinally slidably mounted on one of the handle sections, and a pair of connecting elements mounted on the tool and adapted for engagement with complementary-shaped elements on the retaining ring, whereby a rotational force exerted upon the tool will result in a corresponding rotation of the retaining ring for effecting relative rotation thereof with respect to the associated housing.

16 Claims, 4 Drawing Figures

PATENTED DEC 31 1974 3,857,307
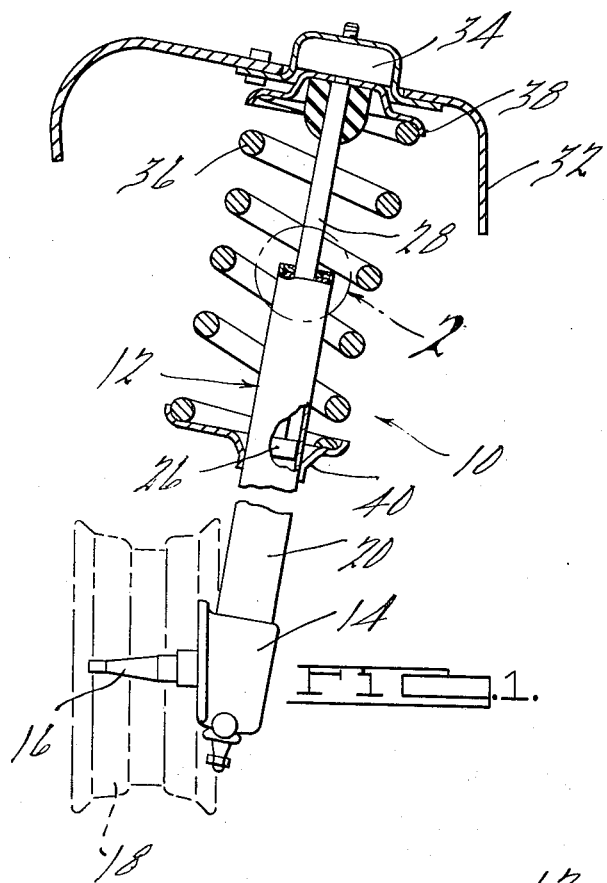
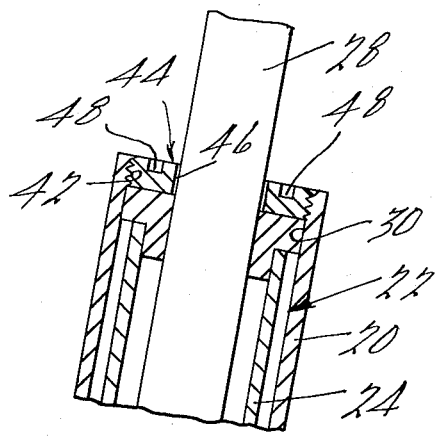
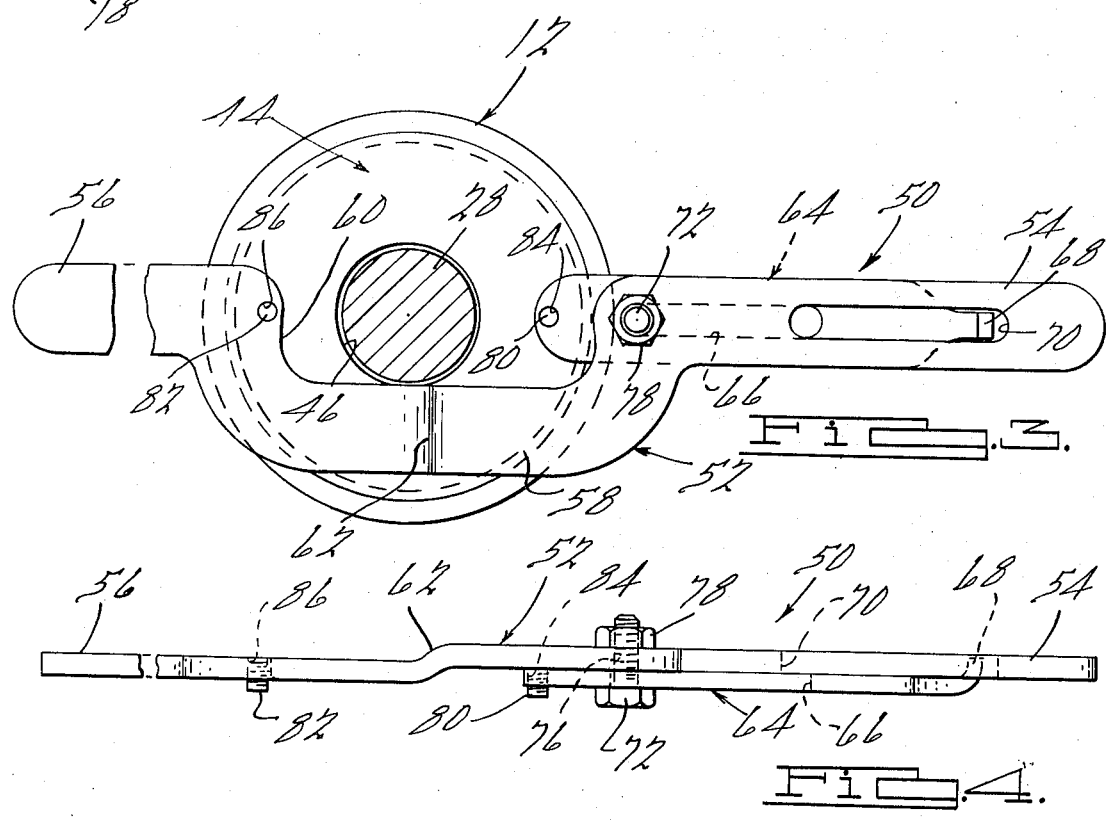

SHOCK ABSORBER ASSEMBLY TOOL

SUMMARY OF THE INVENTION

The present invention relates generally to vehicle suspensions and more particularly, to a new and improved tool for use in removably securing cartridge-type shock absorbers in their associated housings or enclosures in a vehicle suspension.

Vehicle suspensions of the type adapted to removably receive cartridge-type shock absorbers are well known in the art and generally consist of a tubular-shaped housing within which a shock absorber cartridge is operatively disposed. An associated vehicle suspension spring is frequently mounted coaxially of the tubular housing and cooperates with the shock absorber cartridge in providing for a smooth cushioned ride for the vehicle chassis relative to the unsupported axle or the like of the vehicle. As will be appreciated by those skilled in the art, it is desirable to mount the shock absorber cartridges in a manner so as to provide for convenient disassembly or removal thereof from the associated cartridge housings for purposes of replacement, repair or the like. One common way of providing for convenient assembly and disassembly of the shock absorber cartridges is to provide a ring nut or the like within one end of the cartridge housing, which ring nut may be removably mounted such that the same may be unthreaded preparatory to insertion or removal of a shock absorber cartridge into the associated housing. The present invention is directed toward a new and improved tool for use with such ring nuts, whereby to provide for extreme ease of removal thereof, thus minimizing to the extreme the time and effort required to effect the removal and replacement of shock absorber cartridge.

It is accordingly a general object of the present invention to provide a new and improved tool for use in assembling and disassembling vehicle suspension parts.

It is a more particular object of the present invention to provide a new and improved tool for use in assembling and dismantling cartridge-type shock absorbers within their associated housings in automobile vehicle suspensions.

It is another object of the present invention to provide a new and improved tool of the above-described type which is adjustable to accommodate for different types and sizes of shock absorber installations.

It is still another object of the present invention to provide a new and improved tool which may be easily manipulated even where the shock absorber cartridge which is to be removed or replaced is located interiorly of an associated suspension spring extending around the shock absorber housing.

It is yet another object of the present invention to provide a new and improved vehicle suspension tool which is of an extremely simple design, is economical to manufacture and which will have a long and effective operational life.

Other objects and advantages of the present invention will become apparent from the following detailed description taken in conjunction with the accompanying drawing.

BRIEF DESCRIPTION OF THE DRAWING

FIG. 1 is a side elevational view, partially broken away, of a vehicle suspension with which the present invention is intended to be operatively associated;

FIG. 2 is an enlarged fragmentary cross-sectional view of the structure shown within the circle 2 of FIG. 1;

FIG. 3 is an enlarged top elevational view of the present invention; and

FIG. 4 is a side elevational view of the structure shown in FIG. 3.

DESCRIPTION OF A PREFERRED EMBODIMENT

Referring now in detail to the drawing and in particular to FIG. 1 thereof, a vehicle suspension assembly 10 of a type generally shown and described in U.S. Pat. No. 2,624,592, and known in the trade as a MacPherson-type suspension assembly, is shown as comprising a strut 12 which is supported at its lower end within a strut receiving housing 14. The housing 14 is provided with a conventional wheel spindle 16 upon which an associated vehicle wheel 18 may be supported, the housing 14 also conventionally being connected with the turning arm and steering linkage (not shown) of the associated vehicle. The strut 12 includes a generally cylindrically shaped enclosure 20 adapted to removably receive a shock absorber cartridge, generally designated by the numeral 22. The cartridge 22 may be of any suitable construction and comprises a cylindrical shock absorber pressure cylinder 24 within which a valved piston 26 is reciprocally mounted, the piston being secured to the lower end of a piston rod 28 that extends through the upper open end 30 of the housing 20 and is secured to a suitable portion of the associated vehicle body 32 by means including anti-friction bearing assembly or the like 34. As is conventional in the art, the strut 12 may be provided with a helical suspension spring 36 that extends generally coaxially therearound. The spring 36 is typically supported at its opposite ends by means of a pair of spaced-apart spring engaging cups or plates 38 and 40, as illustrated. The open upper end of the housing 20 is internally threaded, as seen as 42, and is adapted to threadably receive an annular, externally threaded ring nut, generally designated by the numeral 44. The ring nut 44 is formed with a central bore or opening 46 through which the piston rod 28 extends and is also provided with a pair of diametrically opposed recesses or blind bores 48 in the upper side thereof. As is well known in the art, special tools are required to effect rotational positioning, i.e., threading or unthreading of the ring nut 44, within the associated enclosure 20, which tools typically utilize means for supporting a pair of downwardly extending projections that are adapted to be removably received within the blind bores 48, whereby a rotational force may be exerted against the ring nut 44. While there exists in the prior art a number of different types of tools which may be used for removing the ring nut 44 when the shock absorber strut 12 is disassociated from the spring 36, body or chassis 32 and wheel suspension associated therewith, due to the limited space available and restricted access to the ring nut 44, such prior art tools cannot be readily utilized. As will hereinafter be described, the present invention provides a new and improved tool for use in assembling and disassembling the shock absorber strut 12 and thus permitting convenient removal of the cartridge 20 located therein.

Referring now in detail to FIGS. 3 and 4, a shock absorber assembly tool 50, in accordance with one preferred embodiment of the present invention, is shown as comprising a one-piece body 52 which includes a pair of generally longitudinally aligned spaced-apart end sections 54 and 56 which are adapted for manual engagement in a manner hereinafter to be described. Disposed intermediate the end sections 54, 56 is a laterally offset intermediate section 58 which defines with the end sections 54, 56 a generally rectangular-shaped recess 60. The lateral dimension of the recess 60 is at least slightly greater than the radius of the piston rod 28 and is preferably approximately equal to the diameter thereof, whereby the tool 50 may be oriented in a position wherein the piston rod 58 is nestingly received within the recess 60 for purposes to be hereinafter described and as best shown in FIG. 3. The end section 54 and approximately one-half the length of the intermediate section 58 are offset upwardly relative to the end section 56 and remaining portion of the intermediate section 58. Accordingly, the end section 54 and associated portion of the intermediate section 58 are located in a plane which is arranged generally parallel to and spaced from a plane within which the end section 56 and associated portion of the intermediate section 58 are located. This offset is generally indicated at 62 and the dimension of the offset is preferably equal to approximately the thickness of an adjustment member, generally designated by the numerals 64, which is operatively associated with the body 52 of the tool 50. As best seen in FIG. 4, the adjustment member 64, like the body 52 of the tool 50, is fabricated of a relatively elongated flat workstock and preferably of uniform transverse dimension. The member 64 is formed with an elongated longitudinally extending central slot 66 and with a generally upwardly projecting end portion 68 at the right end thereof, as depicted in FIGS. 3 and 4. The end portion 68 is adapted to be longitudinally slidably received within a longitudinally slot 70 formed in the end portion 54 of the body 52, whereby the adjustment member 64 may be longitudinally moved along the end section 54.

Means is provided for adjustably fixedly securing the adjustment member 64 at preselected longitudinal positions along the end section 54 of the tool body 52. Such means is preferably, although not necessarily provided by a bolt or similar threaded member 72 which extends upwardly through the slot 66 in the adjustment member 64 and thereafter through a bore 76 formed in the end section 54 of the tool body 52 at a position longitudinally spaced from the inner end of the slot 70. The bolt 72 is operatively associated with a suitable nut or the like 78 which may be threadably advanced upon the bolt 72 to effect compression of the adjustment member 64 and tool body 52 when the adjustment member 54 has been moved to some predetermined longitudinal position thereon, thereby fixedly securing the member 64 at said selected position along the body 52.

As best seen in FIG. 4, the tool 50 is provided with a pair of lug elements 80 and 82 which are adapted to be selectively nestingly received within the blind bores 48 of the ring nut 44 for purposes of rotationally positioning the same upon the strut enclosure 20. The lug element 80 is adapted to be operatively retained within a bore or aperture 84 formed in the inner end of the adjustment member 64 and project downwardly from the lower side thereof. In a similar manner, the lug element 82 is adapted to be operatively received within a suitable bore or aperture 86 formed in the portion of the end section 56 directly adjacent the recess 60. The upper ends of the lug elements 80, 82 are preferably externally threaded and are thus preferably threadably mounted within the bores 84, 86. Alternatively, of course, the lug elements 80, 82 may be pressfitted or otherwise retained within the bores 84, 86 as will be appreciated by those skilled in the art. It will be noted that by virtue of the fact that the tool body 52 is offset at 62, the lug elements 80, 82 lie in the same common plane so as to project downwardly the same distance from the tool 50. In a preferred construction of the present invention, the lug elements 80, 82 are fabricated of a hardened tool steel or the like to assure against premature failure thereof.

In operation of the tool 50 of the present invention, at such time as it is desired to remove or install a shock absorber cartridge, such as the cartridge 32 shown herein, the bolt 72 and nut 78 are loosened to permit the adjustment member 64 to be longitudinally positioned along the end section 54 so that the spacing between the lug elements 80, 82 may be correlated to the diametric spacing of the blind bores 48 in the ring nut 44. At such time as the adjustment member 64 has been properly positioned, the nut 78 may be tightened upon the bolt 72 to assure against any movement between the adjustment member 64 and tool body 52. Preparatory to operatively positioning the tool 50 with respect to the upper end of the shock absorber strut 12, it may be desirable to effect movement of the coil spring 36 so as to provide for convenient access to the upper end of the strut 12. Such means for operatively positioning the spring may be achieved through the use of a spring compressor tool or the like, one construction of which is shown in the copending application, Ser. No. 378,381, filed July 11, 1973 and assigned to the assignee of this application. After proper access has been provided to the upper end of the strut 12, the tool 50 may be positioned in a manner shown in FIG. 3 wherein the piston rod 28 is nestingly received within the recess 60 and the lug elements 80, 82 are inserted into the blind bores 48. Thereafter, the end sections 54, 56 may be manually grasped and biased in the appropriate opposite direction in order to effect rotation of the ring nut 44 relative to the housing 20, whereby the ring nut 44 may be conveniently either removed or installed as desired.

It will be appreciated that the present invention is not necessarily limited to a construction wherein the lug elements 80, 82 are mounted upon the tool per se, since such lug elements could be provided upon the ring nut 44 with suitable complementary shaped apertures being provided on the tool 50 so as to be adaptable for operative engagement with the lug elements. Various other types of connecting means may also be provided upon the ring nut 44 and tool 50 without departing from the scope or fair meaning of the present invention.

While it will be apparent that the preferred embodiment herein illustrated is well calculated to fulfill the objects stated above, it will be appreciated that the present invention is susceptible to modification, varia-

I claim:

1. For use with a cartridge shock absorber in a vehicle suspension including a generally cylindrical housing having at least one open end, a shock absorber cartridge adapted to be removably inserted within the housing and have its piston rod project from the open end thereof, and an annular retaining member adapted to be operatively mounted adjacent the open end of the housing for securing the cartridge therein, the retaining member including at least two connecting elements for use in applying a rotational force thereto, the improvement which comprises,
a tool for assembling and disassembling said retaining member and said shock absorber housing,
said tool comprising a pair of spaced-apart handle portions,
an intermediate portion connected to said handle portions and defining a recessed area therewith,
an adjustable member movably secured to one of said handle portions adjacent one side of said recessed area, and
first and second connecting parts mounted one on said adjustable member and the other on the handle portion and located on the opposite side of said recessed area from said adjustable member,
said handle portions being offset from one another whereby said handle portions lie in spaced parallel planes, said handle portions being offset a distance equal to approximately the thickness of said adjustable member, whereby said connecting parts are located in a common plane extending generally parallel to but spaced from said first and second first-mentioned planes,
said tool being positionable such that the piston rod of the shock absorber is received within the recessed area and said connecting parts are engageable with said first and said connecting elements on said retaining member, whereby a rotational force applied against said handle portions results in rotation of said retaining member relative to said housing.

2. The invention as set forth in claim 1 wherein said tool comprises a one-piece body including said spaced-apart handle portions and said intermediate portion.

3. The invention as set forth in claim 1 which includes guideway means on said adjustable member and the associated of said handle portions for permitting longitudinal slidable movement therebetween.

4. The invention as set forth in claim 3 wherein said guideway means includes an elongated slot and projection means slidably movable within said slot.

5. The invention as set forth in claim 4 wherein said slot is formed in said one handle portion and wherein said projection is formed on said adjustable member.

6. The invention as set forth in claim 1 wherein said connecting elements and said connecting parts comprise recessed portions and outwardly projecting lug portions.

7. The invention as set forth in claim 6 wherein said recessed portions are formed in said retaining member and wherein said outwardly projecting lugs are formed on said tool.

8. The invention as set forth in claim 1 wherein the lateral dimension of said recessed area is at least as great as the radial dimension of said piston rod.

9. The invention as set forth in claim 1 wherein said adjustable member and the associated of said handle portions are formed with longitudinally extending slots, wherein said adjustable member is formed with an outwardly projecting portion adapted to be slidably received within the slot formed in said associated handle portion, and which includes means secured to said associated handle portion and projecting through said slot in said adjustable member for releasably securing said adjustable member at a preselected longitudinal position along said associated handle portion.

10. The invention as set forth in claim 9 wherein said means projecting through said slot in said adjustable member comprises a bolt, and which includes a nut adapted to be threadably received on said bolt for securing said adjustable member in a preselected longitudinal position on said associated handle portion.

11. A tool for use in rotatably positioning a ring nut or the like having first and second spaced-apart connecting elements provided thereon,
said tool including a pair of longitudinally aligned, spaced apart manually engageable end sections, an intermediate section extending between and integrally connecting said end sections and defining a recessed area therewith,
a first connecting part on said wrench and located adjacent one side of said recessed area,
an adjustment member located on the opposite side of said recessed area from said connecting part and being adjustably connected to the associated of said end sections,
a second connecting part on said adjustment member and being movable toward and away from said first connecting part in accordance with the spacing of said connecting elements on the ring nut,
said end sections being offset from one another whereby said end sections lie in spaced parallel planes, said end sections being offset a distance equal to approximately the thickness of said adjustable member, whereby said connecting parts are located in a common plane extending generally parallel to but spaced from said first and second first-mentioned planes,
said first and second connecting parts being selectively engageable with said first and second connecting elements, whereby a rotational force applied against said tool will result in corresponding rotational movement of said ring nut.

12. The invention as set forth in claim 11 which includes guideway means on said adjustable member and the associated of said end sections for permitting longitudinal slidable movement therebetween.

13. The invention as set forth in claim 12 wherein said guideway means includes an elongated slot and projection means slidably movable within said slot.

14. The invention as set forth in claim 11 wherein said connecting elements and said connecting parts comprise recessed portions and outwardly projecting lug portions.

15. The invention as set forth in claim 11 wherein adjustable member and the associated of said end sections are formed with longitudinally extending slots, wherein said adjustable member is formed with an outwardly projecting portion adapted to be slidably received within the slot formed in said associated end section, and which includes means secured to said associated end section and projecting through said slot in said adjustable member for releasably securing said adjustable member at a preselected longitudinal position along said associated end section.

16. The invention as set forth in claim 15 wherein said means projecting through said slot in said adjustable member comprises a bolt, and which includes a nut adapted to be threadably received on said bolt for securing said adjustable member in a preselected longitudinal position on said associated end section.

* * * * *